INVENTORS
JAMES R. JENNESS JR.
HOWARD R. MOORE
BY
ATTORNEYS

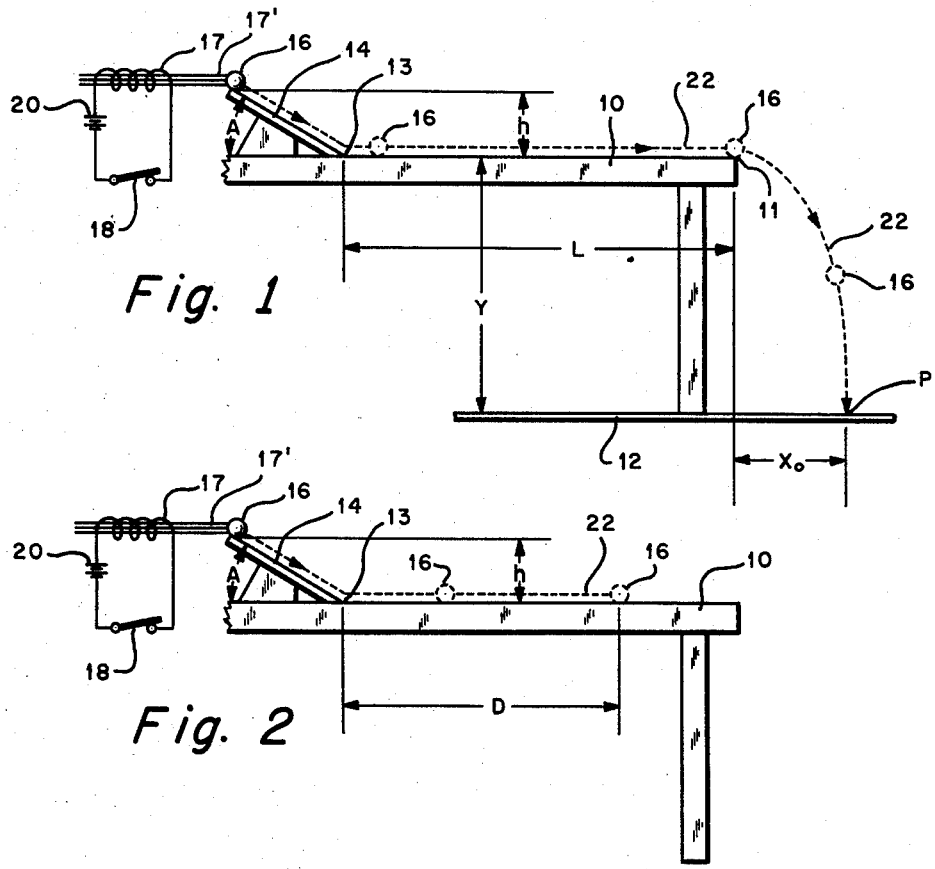
Fig. 1
Fig. 2
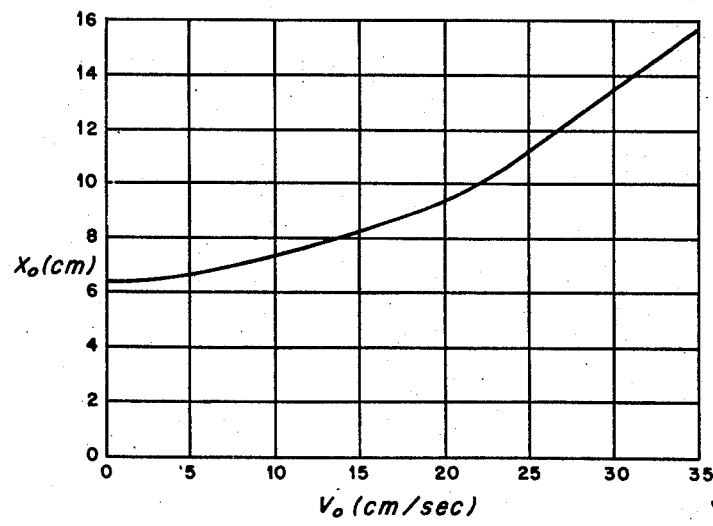
Fig. 5
INVENTORS
JAMES R. JENNESS JR.
HOWARD R. MOORE Dec. 1, 1959 H. R. MOORE ET AL 2,914,942
SURFACE TACK AND SOFTNESS MEASURING METHOD
Filed Aug. 17, 1956 2 Sheets-Sheet 2

United States Patent Office 2,914,942
Patented Dec. 1, 1959

2,914,942

SURFACE TACK AND SOFTNESS MEASURING METHOD

Howard R. Moore, Hatboro, and James R. Jenness, Jr., Southampton, Pa.

Application August 17, 1956, Serial No. 604,854

2 Claims. (Cl. 73—150)

(Granted under Title 35, U.S. Code (1952), sec. 266)

The invention herein described may be manufactured and used by or for the Government of the United States of America for governmental purposes without the payment of any royalties thereon or therefor.

The present invention relates to a method for measuring tack and softness of a surface and more particularly to a method for measuring at progressive intervals after application the surface tack and softness of a coat of paint, varnish, lacquer, or other surface coating to obtain data from which the speed of drying or curing of the coating can be ascertained.

By methods in current use the drying or curing of a coat of paint, varnish, or other surface film cannot be evaluated with extreme precision. For example, a military specification now in use covering water-resistant spar varnish states that the varnish is considered to have dried hard when the maximum pressure that can be exerted between the thumb and finger does not move the film or leave a mark which remains noticeable after the spot is lightly polished. Such a qualitative approach to the evaluation of the drying characteristics of paints, varnishes or other surface films is not considered adequate to meet today's needs for the evaluation and comparison of the large number of paints, varnishes or other surface films available.

It is known that a soft coating applied to a surface increases the rolling friction acting on a sphere or cylinder which rolls over it. This rolling friction decreases to a residual value as the coating hardens. Based upon this principle, U.S. Patent No. 2,338,129 dated January 4, 1944 on a "Method of Determining the Rate of Drying of Coatings" issued in the name of H. R. Moore, describes a method and equipment for measuring the time of descent of a ball rolling down an inclined plane on which a coating of controlled thickness is deposited. As described in the aforementioned patent, the descent time is a quantity which can be used to specify the condition of a surface coating to a greater degree of precision than that attainable by any other tested method. However, the descent time as derived from the method and apparatus described in the patent is a function of several parameters of the equipment, and these must be specified and carefully controlled in order to give reproduceable results. It would, therefore, be preferable to use as a criterion some basic physical quantity which is independent of the equipment employed in determining it.

The present invention overcomes the disadvantages of the methods described above by resorting to the measurement and calculation of a dimensionless index or figure which is independent of equipment parameters and permits precise evaluation of the rate of drying of surface coatings. The method herein described as the present invention utilizes the ratio between the coefficient of rolling friction and the radius of a test ball rolling over the coated surface as this criterion. In the instant method, a steel ball is made to roll from a height $h$ down a launching ramp on to a level test surface. The coating on the surface causes a large coefficient of rolling friction, and the ball is brought to a stop after traveling a distance D. The index of surface condition is shown to be $$S = \frac{h}{D}$$

As the coating hardens, distance D would increase with successive measurements until the ball travels the entire length L of the test panel and falls off the end of the latter. The ball then travels in space a horizontal distance $x_0$ while falling a vertical distance Y, and the value $x_0$ would increase as hardening of the coating continues. Where the ball rolls off the end of the test panel, the index of surface condition is then shown to be $$S = \frac{h}{L} - 0.7 V_0^2 / gL$$

where $V_0$ is the velocity of the ball as it reaches the edge of the test panel and $g$ is gravitation acceleration.

It is therefore a first object of the present invention to provide a method for measuring at progressive intervals of time after application the tack and softness of a coat of paint, varnish, lacquer or other surface coating to obtain data from which the speed of drying or curing a coating can be ascertained.

Another object is the provision of a method for providing precise measurements of surface softness which can be the basis of standards and specifications in a field where well-defined criteria have been lacking.

A further object of this invention is to provide a method of measuring film drying and relative surface hardness of films.

Still another object of this invention is the provision of a method for evaluating the condition of a smooth flat surface in terms of a dimensionless quantity which is independent in value of the particular apparatus utilized for measuring the softness and tack of said surface and permitting uniform comparison with other surfaces evaluated by other types of equipment.

A final object of the present invention is the provision of a method of evaluating the surface condition of a coating of paint, varnish, lacquer, or other surface coating in terms of a universal dimensionless quantity which is independent of the particular apparatus utilized to evaluate said quantity and which is an exact indication of the condition of said surface.

The exact nature of this invention as well as other objects and advantages thereof will be readily apparent from consideration of the following specification relating to the annexed drawing in which:

Figs. 1 and 2 show a schematic arrangement for carrying out the principles of this invention.

Fig. 5 is a plot of the horizontal distance traversed by the steel ball during its drop from the platform versus the velocity of the ball at the instant of leaving the platform.

Figure 3:
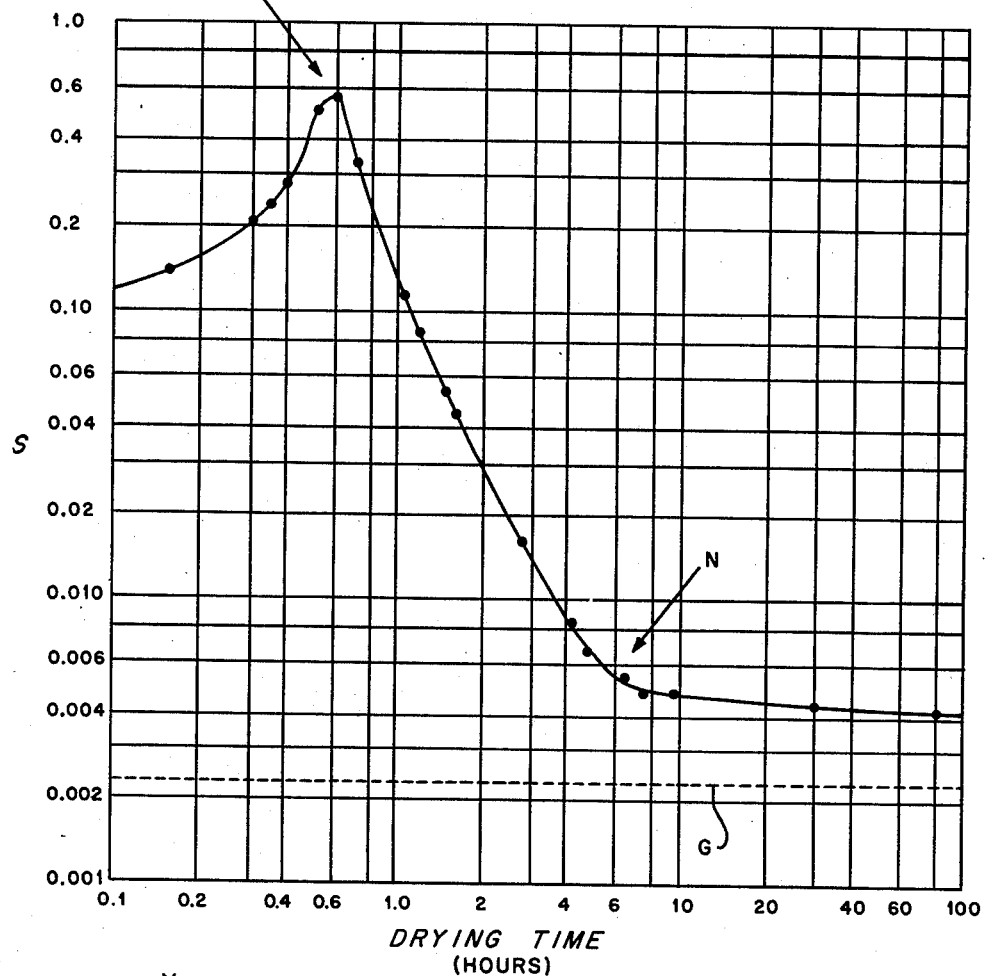
Fig. 3 is a typical plot of the dimensionless tack and softness coefficient versus drying time.

Schematic apparatus capable of carrying out the inventive method of determining an index of surface softness independent of all parameters of the equipment is shown in Figs. 1 and 2. Mounted on a horizontal plate glass platform 10 located above a floor or lower horizontal platform 12 is a launching ramp 14 inclined at some angle A. The steel ball 16 is launched from the top of inclined ramp 14 and is initially held in place by an electromagnetic coil 17 and core 17' which maintain ball 16 in its initial position as long as switch 18 is closed insuring energization of electromagnet 17 from battery 20. When switch 18 is opened thereby cutting off the source of energy to electromagnet 17, ball 20 is released, rolling down ramp 14 across plate 10 and off the end of the latter, provided ball 16 has sufficient energy to traverse the whole length of platform 10. Ball 16 will then land at some point P after following broken line path 22 during its motion. A coating of paint, varnish, or other material to be tested is applied to the surface of plate glass platform 10. Ramp 14 may be constructed of a pair of rails to direct ball 16 correctly and minimize friction effects.

As noted from Fig. 1, ball 16 is released from a position which is at a distance $h$ above horizontal platform 10 which in turn is located a distance of Y above horizontal platform or floor 12. Platform 10 has a fixed length L measured from its edge 11 to point 13 where launching ramp 14 touches platform 10. Point P on lower platform 12 is located a horizontal distance $x_0$ from the vertical projection of edge 11 on floor 12. Any conventional means, such as the use of carbon paper, may be used to record point P. In Fig. 2, ball 16 comes to a stop a distance D from 13 on platform 10.

In the text, "An Introduction to Mechanics," by J. W. Campbell, Pitman Publishing Corp., New York, 1947, pp. 203–204, a brief discussion is presented from which it is seen that the coefficient of rolling friction K (cm. or inches) for a sphere of radius $r$ which rolls without slipping down a plane inclined at an angle A with the horizontal is (1)     $K = r (\tan A - 7a/5g \cos A)$ where $a$ is the translational acceleration of the sphere along the incline and $g$ is gravitational acceleration. The forces exerted on the sphere over the area of contact can be considered as a single resultant R, for which it is convenient to resolve into components $R_p$ parallel to the inclined plane and $R_n$ normal to it. The coefficient of rolling friction K is the lever arm of $R_n$ about the center of the sphere. This results in a frictional torque $R_n K$ which dissipates part of the rolling sphere's kinetic energy.

Referring to Fig. 2, ball 16 will roll down launching ramp 14 on to horizontal test panel 10, where it will travel a distance D, dissipating its initial kinetic energy by rolling friction. Its potential energy before launching is $mgh$ where $m$ is the mass of ball 16, and the work done by rolling friction in stopping it is equal to the product of the frictional torque $R_n K$ and the angle $$\frac{D}{r}$$

through which the ball rotates while being decelerated. (The energy dissipated by rolling friction on the launching ramp is negligible.) $R_n = mg$ since the test surface is horizontal, and hence $mgK(D/r) = mgh$. Solving, (2)     $\dfrac{K}{r} = \dfrac{h}{D}$ for Fig. 2 where the ball does not fall off.

Eventually, as the coating on test surface 10 becomes sufficiently hard, the ball may roll the entire length L of the test panel and fall off the end, travelling a horizontal distance $x_0$ while falling a vertical distance Y, as shown in Fig. 1. If the translational velocity of ball 16 as it reaches the end of the test panel is $V_0$, the residual kinetic energy of the ball (from a discussion further below) is $0.7 mV_0^2$ and the energy relationship is (3)     $mgh = (mgK)\dfrac{L}{r} + 0.7 m V_0^2$ from which (4)     $\dfrac{K}{r} = \dfrac{h}{L} - 0.7 V_0^2 / gL$ for Fig. 1 where the ball falls off platform 10.

The ratio $$\frac{K}{r}$$

given in (2) and (4) for a sphere is a dimensionless ratio. It embodies a general concept of rolling friction including the effect of adhesion of the coating to the ball as well as the effect of the ball sinking into the soft material and is not tied to particular equipment and equipment parameters. As seen from (2), the ratio is independent of angle A of launching platform 14. Then, the index of surface condition S is:

(5)     $S = \dfrac{K}{r}$  where  $\dfrac{K}{r}$ is defined in Formulas 2 and 4 for the two situations covered.

Fig. 3 shows a typical plot of S vs. drying time for water-resistant Spar Varnish, Military Specification MIL–V–1174A, June 19, 1952. The coating here was laid down on a plate glass panel with a DiCostanzo Doctor Blade set at 0.003 inch clearance, as is understood in the art. In the first portion of the curve shown in Fig. 3, up to the peak at M, the coating is newly applied and some varnish is removed by the ball as it rolls over the surface. In this stage of drying, the viscosity of the varnish increases, causing S to increase to a maximum value. Before each successive test run, the ball is wiped clean, as by an acetone-soaked cloth, and launcher ramp 14 is moved a small, lateral distance so that each run is made over a new path. Beyond point M the coating is "tacky," but the ball no longer removes any varnish. After passing the peak, S decreases rapidly for several hours. The coating becomes "tack-free" in the area about N, beyond which S decreases more slowly. In this final portion of the curve, S may be considered a "softness index," and a residual value is attained after a week or more. For comparison, the softness of the uncoated plate glass panel, measured by the same method, is shown by the horizontal broken line G.

Thus it is seen that before point M is reached, the rate of change of S is governed mainly by increasing viscosity. Between points M and N, the dominant effect is decreasing tack, and beyond point N, final hardening takes place. The same phenomena are observed over varying ranges of drying time in many paints, varnishes, lacquers, and other surface coatings.

As seen from relation (4), the translational velocity $V_0$ of ball 16 as it reaches the edge of panel 10 must be evaluated. The value of $V_0$ may be computed from knowing $x_0$ in Fig. 1. Or, $V_0$ may be evaluated by any other suitable manner. The following analysis dealing with the motion of a sphere falling off the edge of a flat level table top, is one method which has proved successful.

Figure 4:
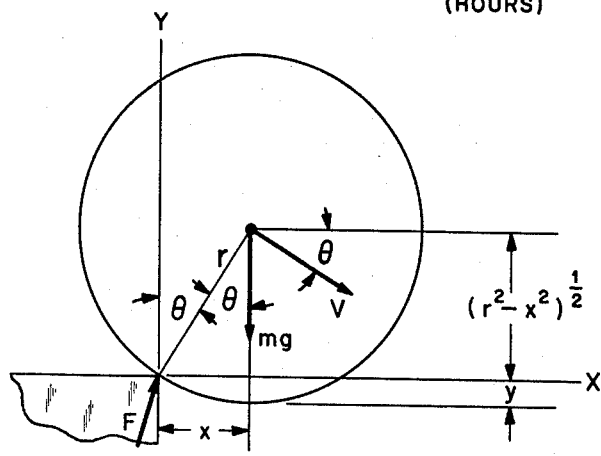
Fig. 4 is a diagram of a sphere falling off the edge of a flat level table top.

Referring to Fig. 4, there is shown sphere 16 of radius $r$ rolling over edge 11 of top 10. The sphere is in contact with the table at a single point where a force F is exerted on it by the edge of the table. Its weight $mg$ acts downward at its center. Let the point of contact between the sphere and the table edge be the origin of a coordinate system in which the location of the lowest point on the sphere's surface is $x, y$.

If the sphere rolls without slipping along the table top, its kinetic energy is (6)     $\frac{1}{2}(mV^2) + \frac{1}{2}(\frac{2}{5})(mr^2)(V/r)^2 = 0.7 mV^2$ where V is the translational velocity of its center. If $V_0$ is the velocity as it reaches the edge, its initial kinetic energy is $0.7 m V_0^2$. As it rolls over the edge, its kinetic energy is $\frac{1}{2}(I_0 \dot\theta^2)$ where $I_0$ is its moment of inertia about the table edge and $\dot\theta$ is its angular velocity. But (7)     $I_0 = \frac{2}{5}(mr^2) + mr^2 = \frac{7}{5}(mr^2)$ and (8) $$\dot{\theta} = V/r$$

Hence (9) $$\tfrac{1}{2}(I_0\dot{\theta}^2) = 0.7mV^2$$

The sphere's potential energy relative to the table top is $mgy$, then the energy relationship is

(10) $$0.7mV_0^2 = 0.7mV^2 + mgy$$
$$= 0.7\ mV^2 + mg((r^2 - x^2)^{1/2} - r)$$

From the geometry of Fig. 4 it is evident that $\sin \theta = x/r$, thus $\cos \theta\ \dot{\theta} = \dot{x}/r$, from which $\dot{\theta} = \dot{x}/r \cos \theta$. It will also be seen from Fig. 4 that $r \cos \theta = (r^2 - x^2)^{1/2}$, then $\dot{\theta} = \dot{x}(r^2 - x^2)^{-1/2}$.

Differentiating again,

(11) $$\ddot{\theta} = \ddot{x}(r^2 - x^2)^{-1/2} + x\dot{x}^2(r^2 - x^2)^{-3/2}$$

Consider now the torque and angular acceleration about the table edge, which give the relationship $mgx = \tfrac{7}{5}(mr^2)\ddot{\theta}$ from which

(12) $$\ddot{\theta} = 5gx/7r^2$$

Combining (11) and (12),

(13) $$5gx/7r^2 = \ddot{x}(r^2 - x^2)^{-1/2} + x\dot{x}^2(r^2 - x^2)^{-3/2}$$

As the sphere rolls off the table, a point is reached where it leaves the edge and begins a free-fall trajectory. When this occurs, $V = V_1$, $x = x_1$, $\dot{x} = V_1 \cos \theta_1 = V_1(r^2 - x_1^2)^{1/2}/r$, and $\ddot{x} = 0$.

Substituting these values in (13) and rearranging, it is seen that

(14) $$(r^2 - x_1^2)^{1/2} = 7V_1^2/5g$$

Substituting from (14) and (10).

(15) $$V_1 = (V_0^2/3 + gr/2.1)^{1/2}$$

After leaving the table, the sphere falls in time $t$ to the floor at a distance $Y$ below the table top, as shown in Fig. 1, and $y = y_1 + V_1 t \sin \theta - \tfrac{1}{2}gt^2$ from which

(16) $$t = V_1 \sin \theta_1/g + (V_1^2 \sin \theta_1/g^2 - 2(y_0 - y_1)/g)^{1/2}$$

where $y_1 = (r^2 - x_1^2)^{1/2} - r$, and $\sin \theta_1 = -x_1/r$, with $x_1$ found from (14) and $V_1$ given by (15). The horizontal distance $x_0$ which the ball travels from the table edge to its impact point on the floor is

(17) $$x_0 = x_1 + V_1 t \cos \theta_1$$
$$= x_1 + V_1 t(r^2 - x_1^2)^{1/2}/r$$

where $x_1$ is found from (14), $V_1$ is given by (15) and $t$ is given by (16). Thus, an expression is obtained for $x_0$ as a function of $V_0$. For values of $V_0$ greater than that for which $x_1 = 0$, the sphere begins its free-fall trajectory at the table edge, and

(18) $$x_0 = V_0(2y/g)^{1/2}$$

A typical curve of $x_0$ vs. $V_0$ produced from the above analysis is shown in Fig. 5. The portion of the curve between $V_0 = 0$ and $V_0 \cong 20$ is bent away from zero because of the edge effect which disappears as $V_0$ increases. Note that even at $V_0 = 0$ there is a substantial, finite value for $x_0$. The values used to plot the graph in Fig. 5 are $r = 0.873$ cm., $Y = 100$ cm., and $g = 980.2$ cm./sec.$^2$. For further testing of surfaces using this apparatus, a graphical determination of $V_0$ can be made from the measurement of $x_0$.

It is thus seen that there has been provided a novel method for the measurement of the softness and tack of a coat of paint, varnish, lacquer, or other surface coating on smooth flat surface. The method produces an index which is dimensionless and thereby independent generally of particular apparatus which may be used for its measurement. The use of this index permits reliable comparison of other test methods and a more scientific and thorough approach to the problem of measuring and analyzing the final condition of coatings and their drying rates.

While the method described above utilizes a spherical object for making tests, it is understood that with appropriate modification of the mathematical analysis other type objects, such as a cylinder, may find application under certain conditions.

Since certain changes in this invention may be made without departing from the spirit and scope thereof, it is intended that all matters contained in the foregoing description and shown in the accompanying drawings shall be interpreted as illustrative and not in a limiting sense.

What is claimed is:

1. A method of determining the rate of drying of a coating which consists of placing a smooth, first flat surface a predetermined vertical distance above and parallel to a horizontally disposed second flat surface, applying a film of the coating in a liquid state to the first flat surface, permitting said film to dry for a predetermined interval of time, rolling a spherical object from a predetermined height down an inclined plane under the influence of gravity onto the first flat surface and over the coating, the spherical object traversing the entire length of said surface and falling off an edge thereof onto the second flat surface a projected distance from the edge of said first surface, and recording said projected distance, the magnitude of said projected distance being an index of the rate of drying of said coating.

2. A method of determining the rate of drying of a coating which consists of placing a smooth, flat surface a predetermined vertical distance above and parallel to a horizontal floor, applying a film of the coating in a liquid state to the surface, permitting said film to dry for a predetermined interval of time, releasing a spherical object from a predetermined height under the influence of gravity down a ramp so inclined with the flat surface to permit the spherical object to traverse the entire length of said surface over said coating and falling off the edge of the surface onto the floor a projected distance from said edge, and recording said projected distance, the magnitude of said projected distance being an index of the rate of drying of said coating.

References Cited in the file of this patent

UNITED STATES PATENTS

| | | |
|---|---|---|
| 1,935,752 | Sward | Nov. 21, 1933 |
| 2,338,129 | Moore | Jan. 4, 1944 |

FOREIGN PATENTS

| | | |
|---|---|---|
| 836,686 | France | Oct. 25, 1938 |
| 289,419 | Switzerland | July 1, 1953 |

OTHER REFERENCES

Blow: "The Measurement of the Adhesion of Unvulcanized Rubber to Metal," Journal of Scientific Instruments, October 1946, vol. 23, pp. 227–229.